United States Patent
Kato et al.

(10) Patent No.: US 8,724,010 B2
(45) Date of Patent: May 13, 2014

(54) IMAGE PICKUP APPARATUS WITH THINNING-OUT SECTION

(75) Inventors: Shingo Kato, Sagamihara (JP); Keigo Matsuo, Akiruno (JP); Hisashi Goto, Suginami-ku (JP)

(73) Assignee: Olympus Corporation, Tokyo (JP)

( * ) Notice: Subject to any disclaimer, the term of this patent is extended or adjusted under 35 U.S.C. 154(b) by 300 days.

(21) Appl. No.: 13/134,291

(22) Filed: Jun. 3, 2011

(65) Prior Publication Data

US 2011/0298963 A1 Dec. 8, 2011

(30) Foreign Application Priority Data

Jun. 4, 2010 (JP) .................................. 2010-129217

(51) Int. Cl.
*G03B 13/00* (2006.01)
*H04N 5/232* (2006.01)

(52) U.S. Cl.
USPC .......................................... 348/345; 348/353

(58) Field of Classification Search
USPC .................. 348/345–357, 234–238
See application file for complete search history.

(56) References Cited

U.S. PATENT DOCUMENTS

| 7,719,605 B2* | 5/2010 | Hirasawa et al. | 348/345 |
| 7,783,186 B2* | 8/2010 | Ishiwata et al. | 396/123 |
| 7,920,781 B2* | 4/2011 | Onuki | 396/121 |
| 8,179,432 B2* | 5/2012 | Yazdanfar et al. | 348/79 |
| 8,237,850 B2* | 8/2012 | Tsujino et al. | 348/353 |
| 8,264,592 B2* | 9/2012 | Inoue | 348/345 |
| 2008/0317454 A1* | 12/2008 | Onuki | 396/128 |
| 2009/0059025 A1* | 3/2009 | Tsujino et al. | 348/222.1 |
| 2010/0165176 A1* | 7/2010 | Taniguchi | 348/345 |

FOREIGN PATENT DOCUMENTS

JP 2009-217252 9/2009

\* cited by examiner

*Primary Examiner* — Timothy J Henn
*Assistant Examiner* — Pritham Prabhakher
(74) *Attorney, Agent, or Firm* — Kenyon & Kenyon LLP

(57) ABSTRACT

An image pickup apparatus includes: an optical imaging system; an image pickup device; a defocus quantity calculation circuit for calculating a defocus quantity based on a phase difference between a plurality of signals for focus detection obtained from a plurality of pixels for focus detection that respectively receive a light flux that has passed through a different pupil region of the optical imaging system; a focusing section for driving the optical imaging system so as to achieve an in-focus state in accordance with the calculated defocus quantity; and a thinning-out circuit for thinning out a plurality of signals for focus detection that are not used for calculating the defocus quantity, based on an analysis result of a signal component of an object image.

22 Claims, 8 Drawing Sheets

IMAGE PICKUP APPARATUS WITH THINNING-OUT SECTION

This application claims benefit of Japanese Application No. 2010-129217 filed in Japan on Jun. 4, 2010, the contents of which are incorporated by this reference.

BACKGROUND OF THE INVENTION

1. Field of the Invention

The present invention relates to an image pickup apparatus, and particularly to an image pickup apparatus having a focus detection function.

2. Description of Related Art

Conventionally, one method of focus detection in an image pickup apparatus such as cameras is a phase difference detection method. An auto-focus (hereafter referred to as AF) function is realized in an image pickup apparatus such as digital cameras by using a sensor for detecting a phase difference. A focus detection function refers to a function of detecting a focus position of an optical imaging system with respect to an object in an image pickup apparatus.

For example, as modern image pickup apparatuses become more digitized, a type of apparatus that detects a phase difference by utilizing a plurality of pixels in an image pickup device for photographing an object has been proposed as disclosed in Japanese Patent Application Laid-Open Publication No. 2009-217252. That is, image pickup and focus detection are simultaneously performed by disposing pixels for focus detection in addition to normal pixels for photographing in the image pickup device.

The image pickup apparatus relating to the proposal exploits some of the pixels of the image pickup device for picking up images of an object as a plurality of pixel pairs for detecting a phase difference, thereby obviating the need of a sensor for focus detection. The plurality of pixel pairs for focus detection are disposed in an alternate and discrete manner on the image pickup device, and are disposed so as to receive only the light flux that has passed through predetermined two pupil regions in the optical imaging system. Further, on the image pickup device a micro lens or a light shielding mask is disposed off centered corresponding to each pixel of the plurality of pixel pairs for focus detection.

Using such an image pickup device will obviate the need of a sensor for focus detection and an optical system for the sensor besides an image pickup device for photographing.

When the defocus quantity is large, although a narrow focus detection region is used to avoid miss detection due to near/far conflict in the apparatus relating to the above described proposal, it is desirable to use a wide focus detection region. The near/far conflict refers to a case where when a far object and a near object are located on substantially the same optical axis, there may be confusion regarding to which of them the focus is adjusted.

SUMMARY OF THE INVENTION

An aspect of the present invention can provide an image pickup apparatus, including an optical imaging system for forming an object image; an image pickup device including a plurality of pixels that photoelectrically converts the object image; a defocus quantity calculation section for calculating a defocus quantity based on a phase difference between a plurality of signals for focus detection obtained from a plurality of pixels for focus detection that respectively receive a light flux that has passed through a different pupil region of the optical imaging system; a focusing section for driving the optical imaging system so as to achieve an in-focus state, in accordance with the defocus quantity calculated at the defocus quantity calculation section; and a thinning-out section for thinning out the plurality of signals for focus detection that are not used for calculating the defocus quantity, based on an analysis result of a signal component of the object image.

BRIEF DESCRIPTION OF THE DRAWINGS

FIG. 4 is a schematic diagram to illustrate the pixel array of the image pickup device 11 relating to the embodiment of the present invention, wherein pixels for focus detection are provided in a plurality of rows in an image pickup plane 11a;

DETAILED DESCRIPTION OF THE PREFERRED EMBODIMENTS

Hereafter, embodiments of the present invention will be described with reference to the drawings.

Figure 1:
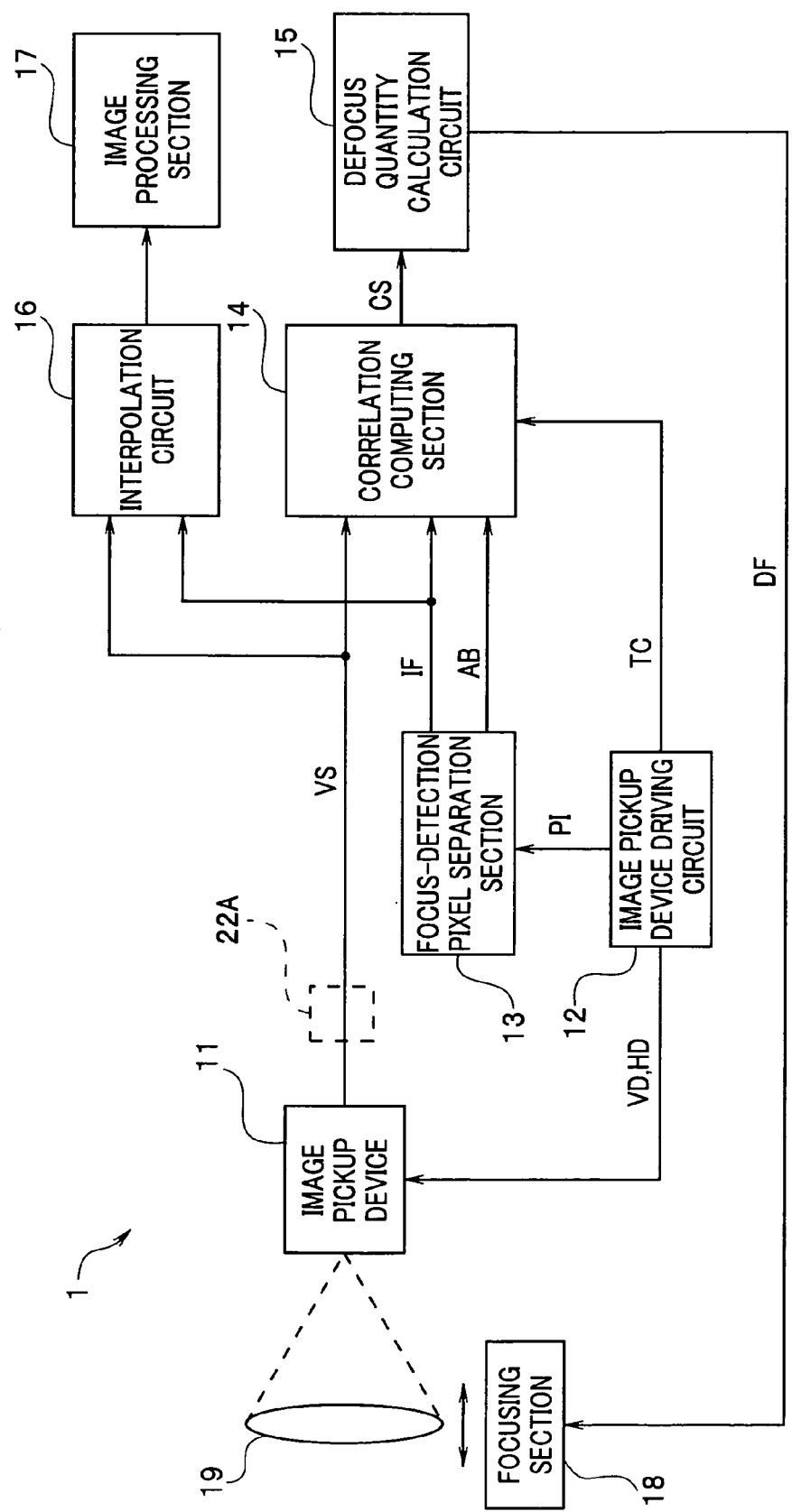
FIG. 1 is a block diagram showing a configuration of an image pickup apparatus relating to an embodiment of the present invention.

First, based on FIG. 1, a configuration of an image pickup apparatus relating to the present embodiment will be described. FIG. 1 is a block diagram showing the configuration of the image pickup apparatus relating to the present embodiment.

An image pickup apparatus 1 is configured to include an image pickup device 11, an image pickup device driving circuit 12, a focus-detection pixel separation section 13, a correlation computing section 14, a defocus quantity calculation circuit 15, an interpolation circuit 16, an image processing section 17, a focusing section 18, and an optical imaging system 19 which forms an object image. For example, the image pickup apparatus 1 is a digital camera etc. having an AF function, in which an object image received via the optical imaging system 19 which is an objective optical system is formed on the image pickup device 11, and an image pickup signal from the image pickup device 11 is subjected to image processing at the image processing section 17. Thereafter, image data generated by the image processing is recorded in a recording medium (not shown) etc.

As described later, the image pickup device 11 includes a plurality of pixels which photoelectrically convert an object image. To be more specific, the image pickup device 11 includes pixels for photographing and pixels for focus detection, and is driven by the image pickup device driving circuit 12 to output an image signal VS which is a video signal photoelectrically converted at the image pickup device 11.

The image pickup device driving circuit 12 outputs a horizontal synchronization signal HD and a vertical synchronization signal VD to the image pickup device 11, and drives in a predetermined order the plurality of pixels disposed in a 2-dimensional matrix form in the image pickup device 11. Further, the image pickup device driving circuit 12 outputs readout position information PI which is position information of a readout pixel of the image pickup device 12 to the focus-detection pixel separation section 13 based on the horizontal synchronization signal HD and the vertical synchronization signal VD, as well as outputs a correlation timing signal TC to the correlation computing section 14.

Here, for example, the readout position information PI is a pulse signal having a predetermined timing corresponding to the positions of the plurality of pixels in a matrix form. For example, each of control signals (VD, HD, PI, TC) delivered by the image pickup device driving circuit 12 is outputted in synchronization with the operation of a release button.

The focus-detection pixel separation section 13 is a circuit that generates a pixel type signal PS that indicates the kind of image signal VS from the image pickup device 11 based on the readout position information PI from the image pickup device driving circuit 12 to output the pixel type signal to the correlation computing section 14.

The pixel type signal PS includes a focus-detection pixel indicator signal IF and a pupil indicator signal AB. The focus-detection pixel indicator signal IF is a signal indicating that the image signal VS is a signal of the pixel for focus detection. The pupil indicator signal AB is a signal indicating to which pupil region of the different pupil regions, predetermined pupil regions A and B in this case, of the optical imaging system 19 a signal of a pixel corresponds. Thus, when the inputted image signal VS is a signal of the pixel for focus detection, the correlation computing section 14 can identify to which pupil region of the pupil regions A and B the signal corresponds, through the pupil indicator signal AB.

Light from the same point of an object is received by a plurality of pixel pairs for focus detection on an image pickup device as light fluxes from the two pupil regions A and B. The plurality of pixels for focus detection are made up of a plurality of pixel pairs, and a micro lens or a light shielding mask is provided in the image pickup device 11 so that one of each pixel pair receives the light flux from the pupil region A, and the other receives the light flux from the pupil region B. The pupil indicator signal AB indicates to which pupil region of the two pupil regions A and B a signal of an image belongs.

The focus-detection pixel separation section 13 incorporates, for example, a counter for counting pulse signals of the readout position information PI, and a storage section for retaining a value corresponding to the position of the pixel for focus detection, and is configured to output a focus-detection pixel indicator signal IF and a pupil indicator signal AB which indicates either of the pupil region A or B when the count value reaches a predetermined value (that is, a value corresponding to the position of the pixel for focus detection).

The correlation computing section 14 receives the inputs of the image signal VS from the image pickup device 11, the focus-detection pixel indicator signal IF and the pupil indicator signal AB from the focus-detection pixel separation section 13, and the correlation timing signal TC from the image pickup device driving circuit 12.

The correlation computing section 14 performs, based on the correlation timing signal TC, a predetermined correlation computation on the image signals VS from a plurality of pixels for focus detection and outputs a computation result CS to the defocus quantity calculation circuit 15.

The defocus quantity calculation circuit 15 as a defocus quantity calculation section calculates a defocus quantity DF by using the computation result CS of the correlation computing section 14 and outputs the quantity to the focusing section 18. That is, since a plurality of signals for focus detection are obtained from a plurality of pixels for focus detection which respectively receive the light flux that has passed through the two pupil regions A and B of the optical imaging system 19, a phase difference is calculated from the calculation result (correlation values) obtained from the correlation computation of the aforementioned signals for focus detection. Then, the defocus quantity calculation circuit 15 calculates a defocus quantity based on the calculated phase difference.

The focusing section 18 drives the optical imaging system 19 according to the defocus quantity DF calculated at the defocus quantity calculation circuit 15, by calculating a moving amount of a focus lens of the optical imaging system 19 from the current position of the focus lens to a position at which the focus lens is in an in-focus state, thereby realizing an AF function of the image pickup apparatus 1.

The interpolation circuit 16 performs interpolation processing on the image signal from the image pickup device and outputs the interpolated image signal to the image processing section 17. To be specific, since a pixel for focus detection cannot be used as a pixel for photographing, the interpolation circuit 16 generates an image signal of the pixel at the position of the pixel for focus detection by interpolation using signals of surrounding image pickup pixels.

The image pickup apparatus 1 is configured such that execution of photographing processing is instructed according to an operation signal from an operation section (for example, a release button of a digital camera) which is not shown, and focus detection is performed during the execution of the photographing processing thus executing an AF function.

Figure 2:
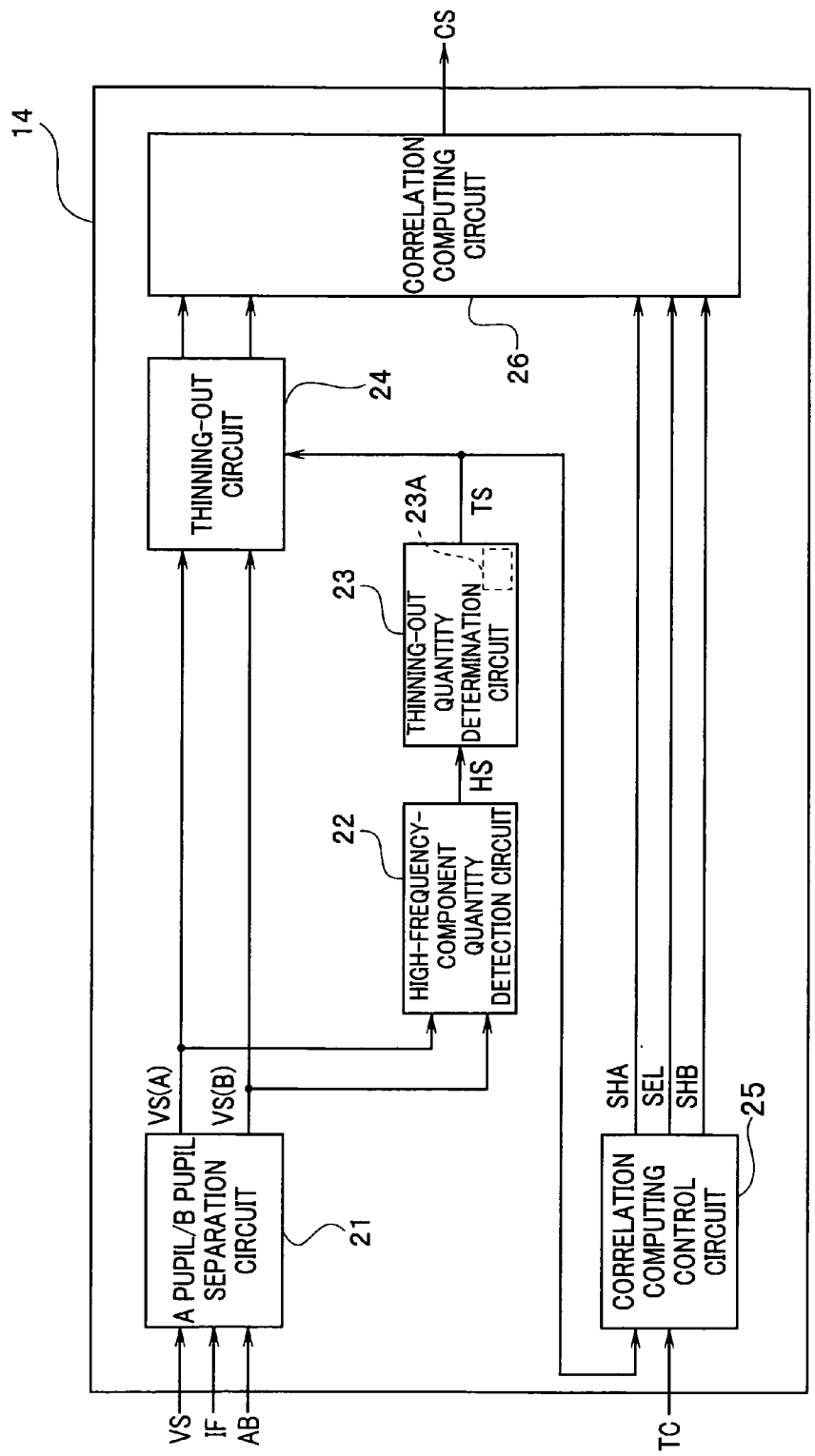
FIG. 2 is a block diagram showing a configuration of a correlation computing section 14 relating to the embodiment of the present invention.

FIG. 2 is a block diagram showing a configuration of the correlation computing section 14. The correlation computing section 14 is configured to include an A pupil/B pupil separation circuit 21, a high-frequency-component quantity detection circuit 22, a thinning-out quantity determination circuit 23, a thinning-out circuit 24, a correlation computing control circuit 25, and a correlation computing circuit 26.

The A pupil/B pupil separation circuit 21 receives the inputs of an image signal VS, a focus-detection pixel indicator signal IF and a pupil indicator signal AB. The A pupil/B pupil separation circuit 21 determines that the inputted image signal VS is an image signal of the pixel for focus detection based on the focus-detection pixel indicator signal IF. Further, the A pupil/B pupil separation circuit 21 determines to which pupil region of the two pupil regions A and B the image signal VS of the pixel for focus detection corresponds based on the pupil indicator signal AB. Thus, the A pupil/B pupil separation circuit 21 outputs only the image signal VS for the pixel for focus detection separately for the pupil regions A and B to the high-frequency-component quantity detection circuit 22 and the thinning-out circuit 24 based on the focus-detection pixel indicator signal IF and the pupil indicator signal AB.

The high-frequency-component quantity detection circuit 22 detects a high-frequency component quantity on a plurality of image signals VS of the pixel for focus detection, which have been continuously inputted. The high-frequency component quantity is one of the analysis results of signal components of an object image.

To be specific, a plurality of image signals VS of the A pupil region or the B pupil region are continuously inputted to the high-frequency-component quantity detection circuit 22. The high-frequency-component quantity detection circuit 22 detects a high-frequency component quantity from the continuously inputted plurality of image signals VS. For example, when a plurality of pixels for focus detection are disposed on one line of the image pickup device 11, a plurality of image signals VS of an A pupil region on that line are continuously inputted to the high-frequency-component quantity detection circuit 22. Then, the high-frequency-component quantity detection circuit 22 takes the difference between two continuously inputted image signals VS, and also takes the sum of the differences, thereby allowing detection of a high-frequency component quantity as an analysis result of the signal components of an object image.

The plurality of image signals VS of the pupil region A or the pupil region B has a larger variation in the amplitude value when the focus is relatively well adjusted, and a smaller variation in the amplitude value when the defocus quantity is large. Thus, the high-frequency component quantity corresponds to the defocus quantity.

The high-frequency-component quantity detection circuit 22 outputs a detection signal HS in accordance with the quantity of the detected high-frequency component to the thinning-out quantity determination circuit 23. That is, the quantity of the high-frequency component contained in the plurality of signals for focus detection obtained from the plurality of pixels for focus detection is outputted from the high-frequency-component quantity detection circuit 22.

Note that the high-frequency-component quantity detection circuit 22 may be configured to detect a high-frequency component quantity contained in the image signal VS of a pixel for photographing from the image pickup device 11. For example, a high-frequency-component quantity detection circuit 22A may be provided on the output side of the image pickup device 11 as shown by a dotted line in FIG. 1, and the quantity of the high-frequency component contained in the image signal VS of a pixel for photographing may be used as the detection signal HS to the thinning-out quantity determination circuit 23.

The thinning-out quantity determination circuit 23 as a thinning-out quantity determination section determines a thinning-out quantity in accordance with the detection signal HS, and outputs a thinning-out quantity signal TS to the thinning-out circuit 24 and the correlation computing control circuit 25.

The thinning-out circuit 24 as a thinning-out section thins out the image signal of a predetermined pixel from the image signal VS of the pixel for focus detection outputted from the A pupil/B pupil separation circuit 21 according to the thinning-out quantity signal TS. In other words, the thinning-out circuit 24 selects a plurality of pixel pairs to be used for focus detection.

Figure 3:
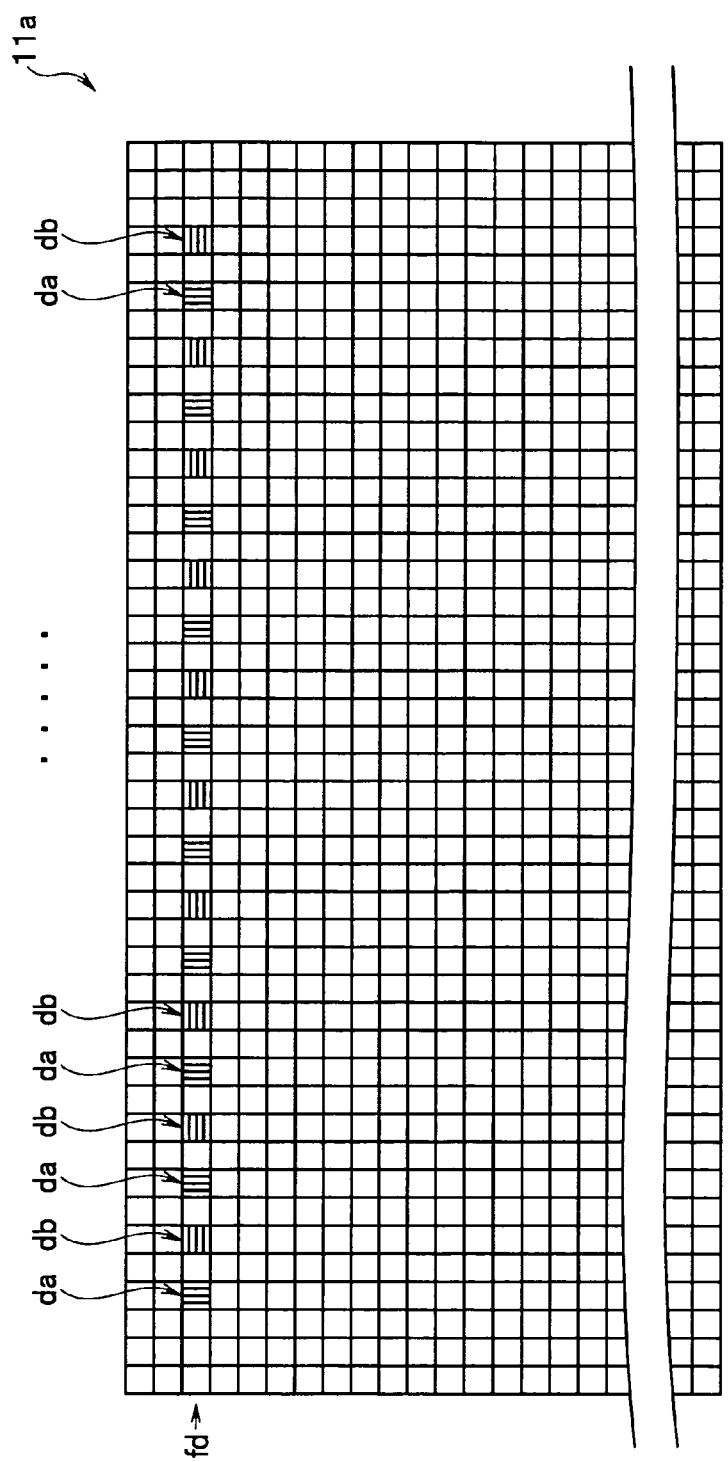
FIG. 3 is a schematic diagram to illustrate a pixel array of an image pickup device 11 relating to the embodiment of the present invention.

FIG. 3 is a schematic diagram to illustrate a pixel array of the image pickup device 11. As shown in FIG. 3, a plurality of pixels are arranged in a matrix form on an image pickup plane 11a of the image pickup device 11.

FIG. 3 shows a part of the pixel array of the image pickup device 11 including a plurality of pixels disposed in a matrix form of M×N (M and N are integers). FIG. 3 shows an example of an image pickup device having 46 pixels in the horizontal direction. The image pickup device has 10 pixels da for focus detection that photoelectrically convert the light flux of the A pupil region and 10 pixels db for focus detection that photoelectrically convert the light flux of the B pupil region, in a row fd. A plurality of pixel pairs da, db for focus detection are discretely disposed in the row fd in the plurality of image pickup pixels. Note that since the pixels da and db for focus detection cannot be used as pixels for photographing, preprocessing to generate interpolated pixels from the surrounding pixels for photographing is performed to generate image signals for photographing for the pixels at the positions of the pixels da and db for focus detection, as described above.

Figure 4:
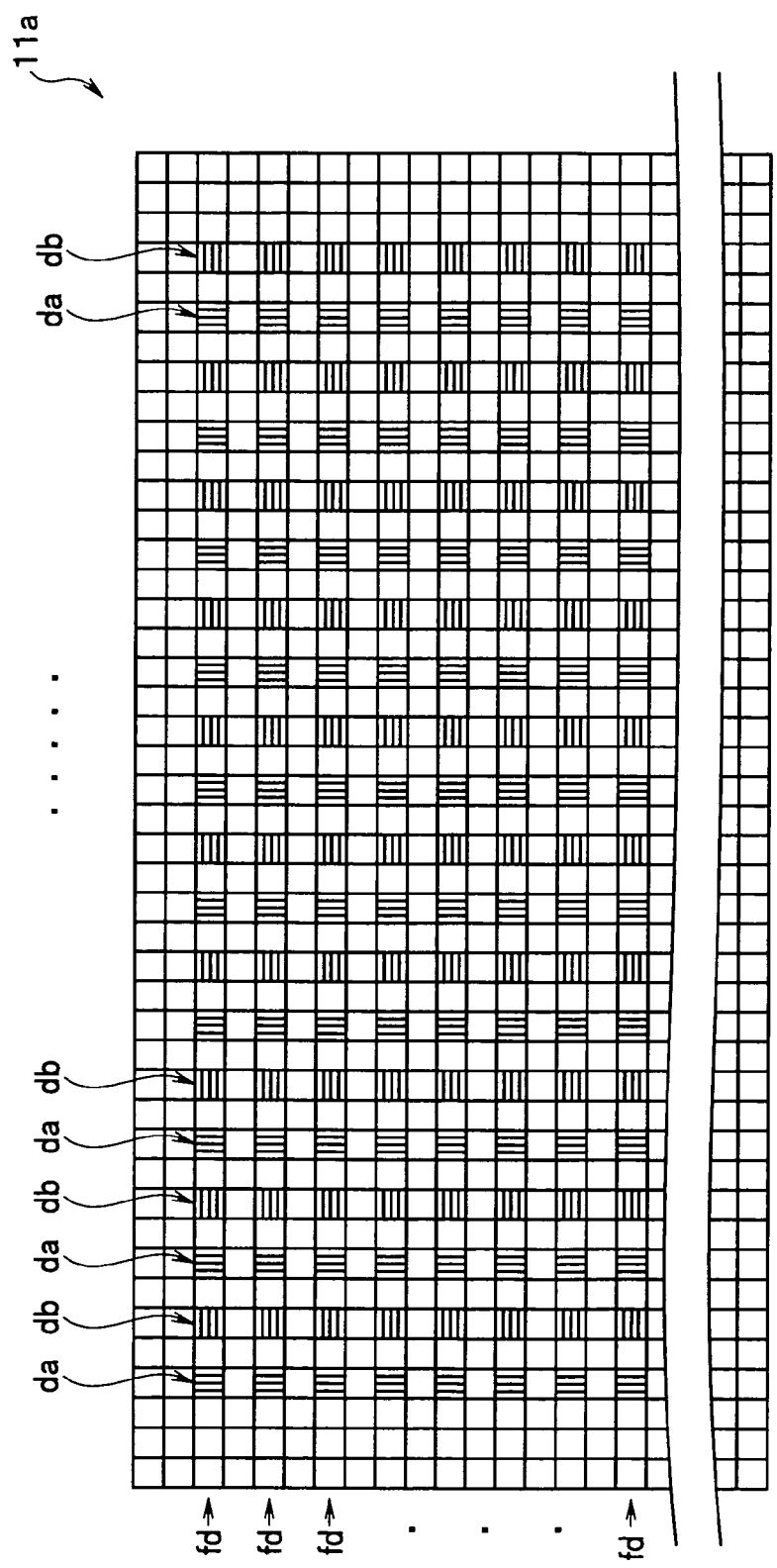

Note that in FIG. 3, although the plurality of pixel pairs for focus detection are provided in only one row of the image pickup plane 11a, they may be provided in a plurality of rows as shown in FIG. 4. FIG. 4 is a schematic diagram to illustrate a pixel array of the image pickup device 11, in which the pixels for focus detection are provided in a plurality of rows of the image pickup plane 11a.

In the row fd, pixels da with vertical stripes receives the light flux from the pupil region A, and the pixels db with horizontal stripes receives the light flux from the pupil region B. That is, 10 pixels da in the row fd receive the light flux from the pupil region A, and 10 pixels db in the row fd receive the light flux from the pupil region B.

Pixels for photographing (pixels other than da and db) exhibit no variation in the phase of signals regardless of the state (in-focus, out-of-focus) of the optical imaging system 19. However, the pixels da and db for focus detection receive the light at positions which are deviated from each other in the left and right directions in accordance with the state (in-focus, out-of-focus) of the optical imaging system 19 due to a micro lens or a light shielding mask which is disposed off-centered as described above. Thus, the image of a pixel for the pupil region A is shifted slightly to the right (or the left) from the image of an image pickup pixel, and the image of a pixel of the pupil region B is shifted slightly to the left (or the right) from the image of an image pickup pixel. The shift quantity increases in accordance with a defocus state, and there is a proportional relation between the shift quantity and the defocus quantity. By taking advantage of this phenomenon and the proportional relationship, an AF function is realized by driving the optical imaging system 19 so as to achieve an in-focus state, in accordance with the detected defocus quantity.

Here, when the high-frequency component quantity is large in the signal of the plurality of pixel pairs da, db for focus detection, the focus is generally in an in-focus state or a state close to an in-focus state. When the high-frequency component quantity is small, the focus is generally in a defocus state.

Referring back to FIG. 2, the thinning-out quantity determination circuit 23 determines whether or not the detection signal HS is not more than a predetermined threshold th, and generates and outputs a thinning-out quantity signal TS that instructs a predetermined thinning-out quantity when the detection signal HS is not more than the predetermined threshold th.

The thinning-out circuit 24 thins out a predetermined number of pixels from the plurality of pixel pairs for focus detection in accordance with the thinning-out quantity signal TS, and outputs the image signals VS of the remaining plurality of pixel pairs which have not been thinned out to the correlation computing circuit 26. That is, the thinning-out circuit 24 makes up a thinning-out section that thins out the image signals VS of a plurality of pixel pairs for focus detection which are not used for calculating the defocus quantity based on a high-frequency component quantity as one of the analysis result of the signal components of an object image.

For example, in the case in which there are k pixels for focus detection respectively for the pupil regions A and B, when the thinning quantity is m, (k×m) pixels for focus detection are used. In the case of FIG. 3, suppose that the thinning-out quantity is ½, a half of 10 pixel pairs of focus detection (that is, 5 pixel pairs) are thinned out and not used, and remaining 5 pixel pairs are used for correlation computation in the correlation computing circuit 26.

Note that two or more thresholds may be provided such that a thinning-out quantity corresponding to each threshold is determined.

Moreover, in this configuration, the thinning-out quantity determination circuit 23 compares the detection signal HS in accordance with a high-frequency component quantity with a predetermined threshold th, and if the detection signal HS is not more than the threshold th (that is, the focus is more blurred than in a predetermined defocus state), the thinning-out circuit 24 performs the thinning-out of a predetermined thinning-out quantity. It may also be configured, for example, such that a table 23A that stores in advance a plurality of thinning-out quantities in accordance with a high-frequency component quantity is provided, as shown by a dotted line in FIG. 2, and the thinning-out quantity determination circuit 23 refers to the table 23A to determine a thinning-out quantity based on the detection signal HS.

For example, the high-frequency component quantity is divided into five steps, and a thinning-out quantity corresponding to each step is stored in a table in advance. The thinning-out quantity determination circuit 23 may be adapted to determine to which step the inputted detection signal HS belongs, and outputs the thinning-out signal TS of the determined step to the thinning-out circuit 24.

Note that the threshold th is determined in advance according to an optical characteristic of the optical imaging system 19, that is, an optical imaging characteristic value. The optical characteristic of the optical imaging system 19 may be an angle of view, a characteristic of zoom lens, or the like.

The correlation computing control circuit 25 is a circuit that outputs shift signals SHA and SHB and a selection signal SEL to be described later to the correlation computing circuit 26 based on the thinning-out signal TS from the thinning-out quantity determination circuit 23, and the correlation timing signal TC from the image pickup device driving circuit 12.

Figure 5:
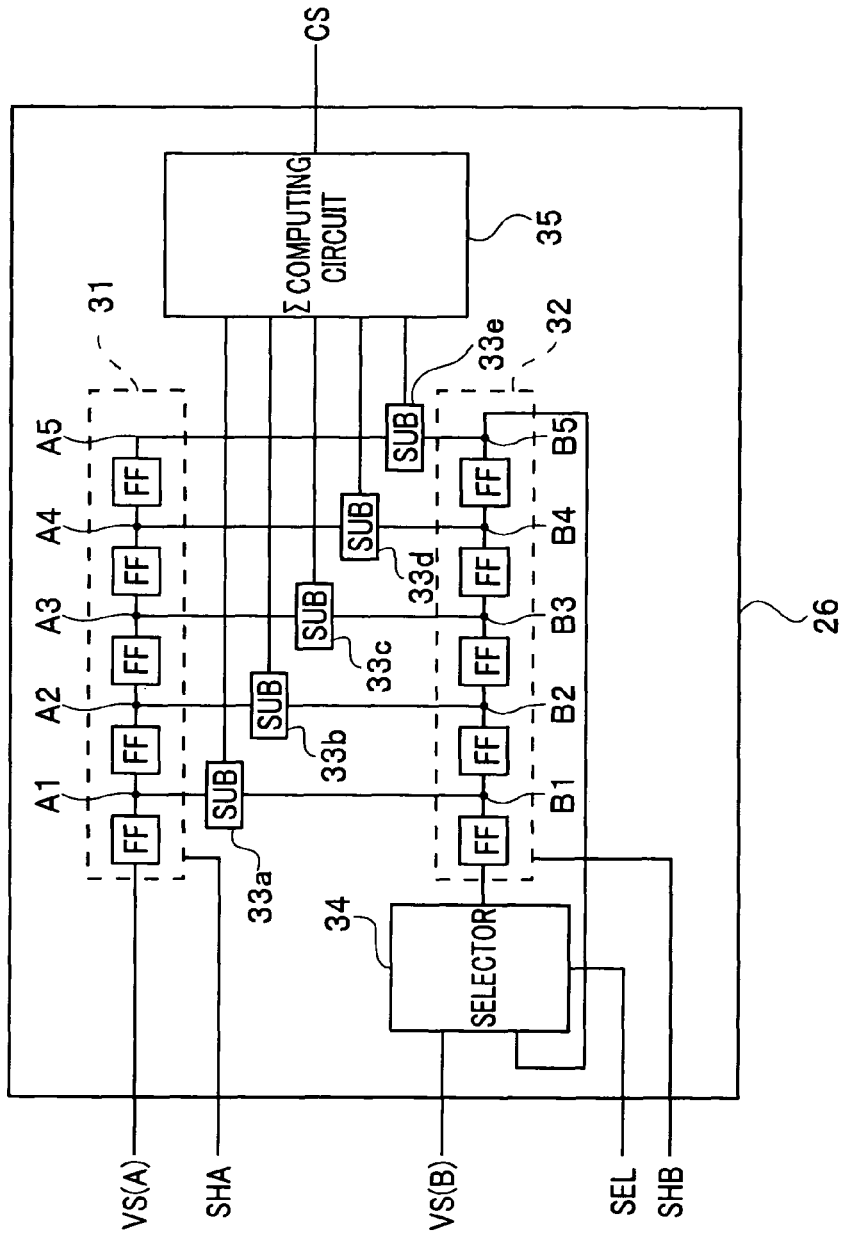
FIG. 5 is a circuit diagram showing a configuration of a correlation computing circuit 26 relating to the embodiment of the present invention.

FIG. 5 is a circuit diagram showing a configuration of the correlation computing circuit 26. The correlation computing circuit 26 is configured to include two shift registers 31 and 32, a plurality of differential circuits 33 (33a, 33b, 33c, 33d, and 33e), a selector 34, and a Σ (sigma) computing circuit 35.

The shift registers 31 and 32 respectively include a plurality of, five in this case, serially connected flip flops (hereafter, referred to as FF). The shift register 31 receives the input of image signals VS of the five pixels da for focus detection from the thinning-out circuit 24 in a predetermined order, and the shift register 32 receives the input of image signals VS of five pixels db for focus detection from the thinning-out circuit 24 in a predetermined order.

The shift registers 31 and 32 receive the inputs of the shift signals SHA and SHB, respectively. The shift registers 31 and 32 shift the image signal VS in turn among the five serially connected FFs based on the shift signals SHA and SHB, respectively.

Each differential circuit 33 takes difference between the image signals VS of two corresponding FFs in the shift registers 31 and 32, and outputs a signal of the absolute value thereof to the Σ computing circuit 35. For example, a first differential circuit 33a outputs an absolute value of the difference between the output signal (A1) of the first FF of the shift register 31 and the output signal (B1) of the first FF of the shift register 32. A second differential circuit 33b outputs an absolute value of the difference between the output signal (A2) of the second FF which is the next to the first FF of the shift register 31 and the output signal (B2) of the second FF, which is the next to the first FF of the shift register 32. Similarly, third to fifth differential circuits 33c to 33e output absolute values of differences respectively between the signals of the third, fourth, and fifth FFs of the shift register 31 and the third, fourth, and fifth FFs of the shift register 32.

The selector 34 is a circuit that selects a signal to be inputted to the shift register 32. The selector 34 is a circuit for switching the inputs of the shift register 32 such that the output of the fifth FF is returned to the input of the first FF in order to perform correlation computation while displacing the image signals VS in turn in the shift register 32, after a predetermined number (five in this case) of image signals VS are inputted to the shift register 32.

The selector 34 switches the input to the shift register 32 from the pixel db for focus detection to the fifth FF based on a selection signal SEL.

When letting a discrete image signal VS obtained from the pupil region A be An, and a discrete image signal VS obtained from the pupil region B be Bn, a correlation value can be obtained by performing the computation of $\Sigma|An-Bn|$ (where, n is the number of pixels used in the correlation computation, and 1 to 5 in the case of FIG. 5). The correlation value is outputted as a computation result CS.

The correlation computing circuit 26 of FIG. 5 has a configuration to allow a high speed computation of $\Sigma|An-Bn|$. That is, the plurality of FFs for An and Bn each are serially connected to function as a shift register. Moreover, in the shift register 32 for Bn, an image signal is caused to go around in the shift register 32 by the selection signal SEL.

Figure 6:
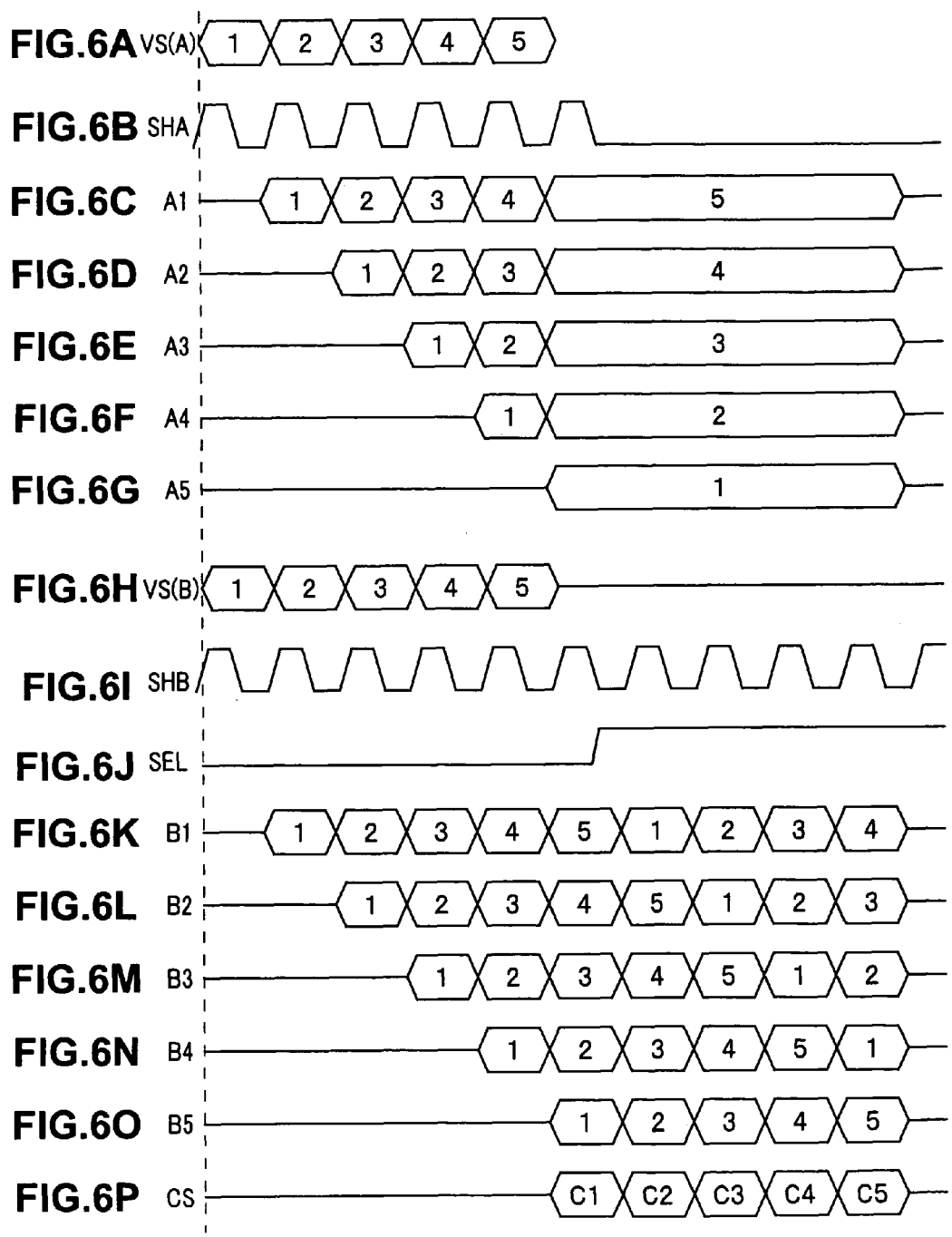
FIGS. 6A to 6P are timing charts showing operations of the circuit of FIG. 5.

FIGS. 6A to 6P are timing charts showing operations of the circuit of FIG. 5. The image signal VS(A) in the pupil region A is shifted in turn from the first FF to the fifth FF in the shift register 31 based on the shift signal SHA. After five image signals VS are inputted, the shift signal SHA will not be inputted so that the output of each FF is retained as it is.

While, on the other hand, the image signal VS(B) of the pupil region B is also shifted in turn from the first FF to the fifth FF in the shift register 32 based on the shift signal SHB, after five image signals VS are inputted, the selector 34 is switched by the selection signal SEL so that the output of the fifth FF is inputted to the first FF. After the five image signals VS are inputted as well, the image signal is shifted in turn from the first FF to the fifth FF in the shift register 32 based on the shift signal SHB.

As a result of that, after five image signals VS are inputted to each of the shift registers 31 and 32, the output of each FF of the shift register 32 varies in turn while the output of each FF of the shift register 31 will not vary.

Thus, the Σ computing circuit 35 obtains by computing the sum of the absolute values of the difference values between the five image signals VS of the pupil region A, which are inputted while being shifted one by one by causing the image signal VS of the pupil region B to go around, and five image signals of the pupil region B, and outputs results as five computational results CS. In FIG. 6P, five computation results are designated by C1, C2, C3, C4, and C5. The five computation results indicate correlation values in accordance with the shift quantity. The defocus quantity calculation circuit 15 calculates a deviation quantity corresponding to a shift quantity having a minimum correlation value, that is, a defocus quantity, from the inputted five computation results.

Figure 7:
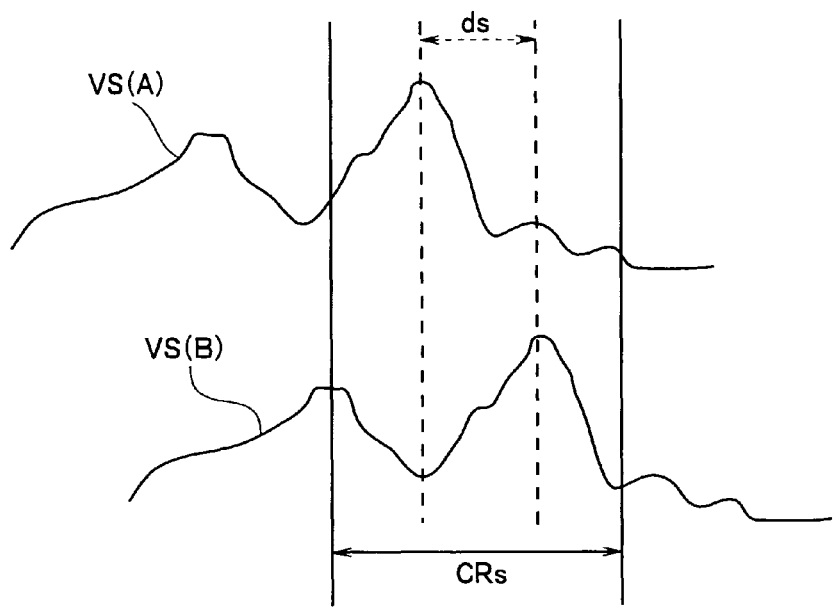
FIG. 7 is a diagram showing states of two image signals VS relating to the embodiment of the present invention, when the defocus quantity is small.
Figure 8:
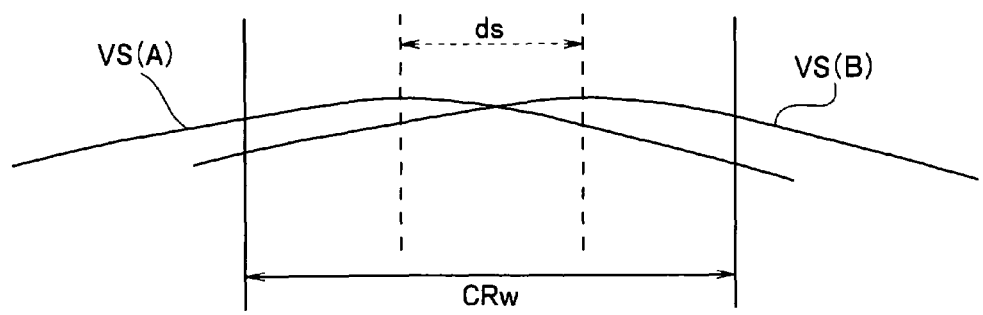
FIG. 8 is a diagram to illustrate a phase difference between two image signals VS obtained in pupil regions A and B, relating to the embodiment of the present invention, when a defocus quantity is large.

FIGS. 7 and 8 are diagrams to illustrate the phase difference between the two image signals VS obtained in the pupil regions A and B. FIG. 7 is a diagram showing the states of two image signals VS when the defocus quantity is small. In FIGS. 7 and 8, the image signal of the pupil region A is indicated by VS(A), and the image signal of the pupil region B is indicated by VS(B). Here, a phase difference ds between a signal pattern of the image signal of one pixel da of the plurality of pixel pairs and a signal pattern of the image signal of the other pixel db thereof is detected.

In FIG. 7, since the defocus quantity is small, the two image signals VS contain many high-frequency components. For that reason, the phase difference ds can be detected with only image signals of a small range of the plurality of pixel pairs, in the row fd containing a plurality of pixels for focus detection. As shown in FIG. 7, in the row fd containing a plurality of pixels for focus detection, the phase difference ds can be detected even when the range CRs of the plurality of pixel pairs to be used for correlation computation is a relatively small range.

FIG. 8 is a diagram to illustrate a phase difference between the two image signals VS obtained in the pupil regions A and B when the defocus quantity is large. Since the defocus quantity is large, the two image signals VS does not contain many high-frequency components. Therefore, in the row fd containing a plurality of pixels for focus detection, the phase difference ds cannot be detected unless the image signal of a plurality of pixel pairs ranged over a wider range are used. As shown in FIG. 8, in the row fd containing a plurality of pixels for focus detection, the range CRw of a plurality of pixel pairs to be used for correlation computation is wider than the range CRs of FIG. 7.

That is, the width of the pixels for focus detection to be used for correlation computation, that is, the range CR of the pixel to be used for focus detection is wider when the focus is defocused, than when the focus is well adjusted. This is because defocus causes blurring of the image itself, resulting in a signal waveform with less characteristic features.

At this time, using the plurality of pixel pairs for focus detection ranged over a wide range as they are such that accurate correlation computation can be performed even during defocus will require a corresponding number of circuits for correlation computation.

Accordingly, in the present embodiment, while a plurality of pixel pairs for focus detection ranged over a wide range are used during defocus, the plurality of pixel pairs as many as those used when the defocus quantity is small are selected to be used.

To be specific, the correlation computing section 14 is configured such that the thinning-out of the plurality of pixels for focus detection is performed when the defocus quantity is large based on the high-frequency component quantity, and the plurality of pixels to be used for correlation computation at the correlation computing section 14 is as many as those when the defocus quantity is small.

For example, when the defocus quantity is small, the image signal VS of five pixels for each of the pupil regions A and B in a central portion of the image pickup plane 11a are used for correlation computation; when the defocus quantity is large, image signals VS of five pixels for each of the pupil regions A and B which are ranged over a wide range of the image pickup plane 11a, for example, image signals VS of five pixels which are alternately selected from 10 pixels for each of the pupil regions A and B are used for correlation computation. In this case, the thinning-out quantity is ½.

Note that the pixels to be thinned out and the pixels to be used for correlation computation are selected so as to be evenly distributed in the row fd. For example, when the thinning-out quantity is ½, a plurality of pixel pairs for focus detection are selected so as to be alternately thinned out in the row fd.

Furthermore, it is noted that the phase difference ds can be normalized by being multiplied by the inverse of the thinning-out quantity. For example, when the thinning-out quantity is ½, since pixel pairs are alternately thinned out on the image pickup device 11, the phase difference ds, that is a deviation quantity, can be normalized by multiplying the phase difference ds1 without thinning-out by 2, which is the inverse of ½. Thus, the correlation computing section 14 is configured to output a normalized deviation quantity.

Thus, the defocus quantity calculation circuit 15 as a defocus quantity calculation section calculates and outputs a defocus quantity DF based on the phase difference of a plurality of signals for focus detection obtained from the plurality of pixels for focus detection that respectively receive a light flux that has passed through a different pupil region of the optical imaging system 19.

As described so far, while the correlation computing section 14 of an image pickup apparatus 1 of the present embodiment utilizes image signals of a plurality of pixel pairs for focus detection over a wide range during defocus, since the number of image signals used for correlation computation is the same as the number of the plurality of pixel pairs to be used when the defocus quantity is small, the circuit scale of the correlation computing section 14 will not be increased.

In the correlation computing section 14, though a plurality of correlation values are obtained according to the shift quantity in the shift register, since the number of the plurality of pixel pairs for focus detection to be used when the defocus is large is the same as the number of the plurality of pixel pairs to be used when the defocus is small, the computing time is the same as well.

As so far described, according to the image pickup apparatus of the present embodiment described above, it is possible to use a wide focus detection region when the defocus is large, and the circuit scale for the correlation computation will not increase. Further, according to the image pickup apparatus of the present embodiment described above, the time for correlation computation will not increase even when the defocus is large.

Moreover, in the present embodiment, since a plurality of pixel pairs for focus detection are included in the image pickup device 11, there is no need of providing a sensor for focus detection aside from the image pickup device.

Note that in the above described embodiment, although a digital camera is named as the image pickup apparatus, it may be monitoring cameras and endoscopes, etc.

Next, variant embodiments will be described.

Variant Embodiment 1

In the image pickup apparatus of the embodiment described above, the thinning-out quantity is determined based on the quantity of the high-frequency component contained in the image signals VS of a plurality of pixel pairs for focus detection, or based on the quantity of the high-frequency component contained in the image signals VS of a plurality of pixels for photographing of the image pickup device 11.

However, in place of the high-frequency component quantity as the analysis result of the signal components of an object image, an average luminance value of a plurality of pixels for photographing of the image pickup device 11 may be used.

The average luminance value may be determined by dividing an integration value (that is, an amplitude integration value) of the values of a plurality of pixels for photographing (that is, amplitude values) by the number of pixels. When the defocus quantity is large, the average luminance value becomes small, and when the defocus quantity is small, the average luminance value becomes large.

Thus, the correlation computing section may determine the thinning-out quantity by using an average luminance value of a plurality of pixels of the image pickup device as the analysis result of the signal components of an object image.

Variant Embodiment 2

In the image pickup apparatus of the embodiment described above, as shown in FIG. 3, the quantity of the high-frequency component contained in the image signals of a plurality of pixel pairs for focus detection on one row fd is detected, and based on the detection result, a plurality of signals for focus detection to be used for calculating a phase difference are selected from the plurality of pixel pairs on the row fd. In other words, based on the detection result of the high-frequency component quantity, a plurality of signals for focus detection which are not used for calculating the phase difference are thinned out from the pixel pairs on the row fd.

However, as shown in FIG. 4, when a plurality of pixel pairs for focus detection are provided over a plurality of rows on the image pickup device 11, it may be configured such that a plurality of pixel pairs for focus detection in a predetermined row is used for detecting a high-frequency component, and the plurality of pixel pairs for focus detection in other rows are used for calculating a phase difference. In such a case, thinning-out is performed from the plurality of signals for focus detection to be used for calculating the phase difference.

In the embodiments described above and the present variant embodiment, since the detection of a high-frequency component quantity and the determination of thinning-out are performed in a frame, it is possible to appropriately perform focus detection even when the state of an object varies.

Variant Embodiment 3

In the image pickup apparatus of the embodiment described above, a defocus quantity is detected by using an image signal VS in one frame, and the computation for detecting a phase difference for the frame is performed. However, it may be configured such that a defocus quantity is detected based on the image signals of a certain frame, and the image signals of the plurality of pixel pairs which are not used for correlation computation are thinned out (or the image signals of the pixel pairs to be used for correlation computation are selected) from image signals of the plurality of pixel pairs for focus detection in a subsequent frame, for example, the next frame, so that a plurality of image signals of the remaining (or selected) plurality of pixel pairs are used for performing correlation computation.

That is, it may be configured such that a high-frequency component or an average luminance value is detected in one preceding frame of two different frames, and thinning-out is performed in the other frame such that the image signals of a plurality of pixel pairs to be used for correlation computation are selected. In this case, a buffer circuit for storing image signals VS of a plurality of frames is separately provided.

Moreover, in that case, when a plurality of pixel pairs for focus detection are provided in a plurality of rows as shown in FIG. 4, the plurality of pixel pairs for detecting a high-frequency component etc. and the plurality of pixel pairs to be used for correlation computation may be used for each purpose.

Variant Embodiment 4

Although, in the image pickup apparatus of the embodiment described above and each variant embodiment, a high-frequency component quantity or an average luminance value is obtained from a plurality of image signals VS in one frame, it may be configured such that when the image signals VS are smaller than a predetermined threshold, image signals for a predetermined number of frames are added, and the added image signals are used to perform the detection of the high-frequency component quantity or the average luminance value. That is, the high-frequency component quantity or the average luminance value may be determined from image signals which are added between frames.

Variant Embodiment 5

Although, in the embodiment described above and each variant embodiment, a plurality of pixel pairs for focus detection are provided on the image pickup device for photographing of an object, the pixel pairs may be provided separately from such image pickup device.

Figure 9:
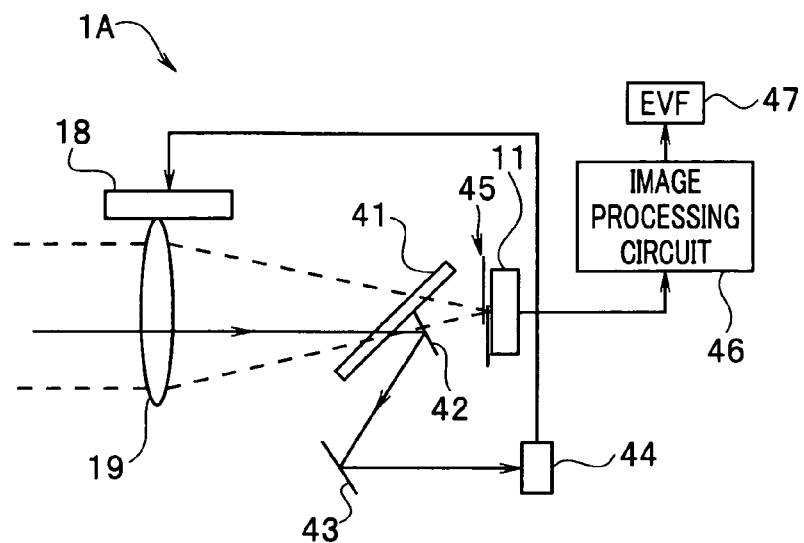
FIG. 9 is a diagram to illustrate a configuration of an image pickup apparatus 1A relating to a variant embodiment of the embodiment of the present invention.

FIG. 9 is a diagram to illustrate a configuration of an image pickup apparatus 1A of the present variant embodiment. In FIG. 9, the same components as those of FIG. 1 are given the same reference characters thereby omitting the description thereof. As shown in FIG. 9, in the image pickup apparatus 1A which is a digital camera, the light from the optical imaging system 19 strikes a sub-mirror 42 provided in a mirror 41 having a half mirror to be reflected. The reflected light from the sub-mirror 42 is further reflected at a sub-mirror 43, and is received by a sensor 44 including a plurality of pixel pairs for focus detection and a correlation computing section. The sensor 44 outputs a defocus quantity DF in accordance with the detected phase difference.

When an object is photographed, the mirror 41 moves up and a shutter 45 is driven so that light from the object enters into an image pickup device 11A. The image pickup device 11A does not include a plurality of pixel pairs for focus detection. The image signal VS from the image pickup device 11A is inputted to an image processing section 46, is recorded in a recording medium not shown, and is further outputted to, for example, an electronic view finder (EVF) 47, so that the photographed object image is displayed.

Figure 10:
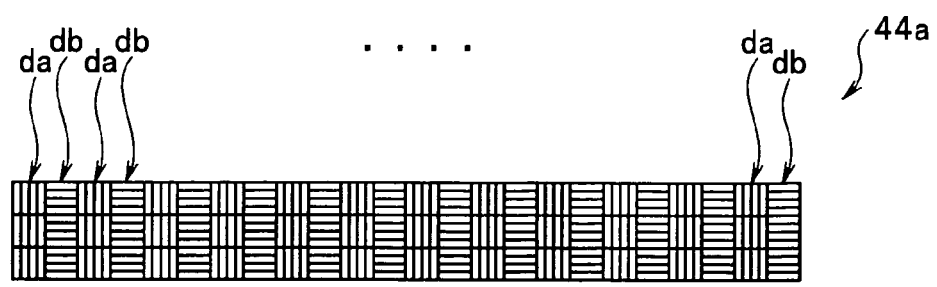
FIG. 10 is a schematic diagram to illustrate a pixel array of a plurality of pixel pairs for focus detection, in an image pickup plane of a sensor 44 relating to a variant embodiment of the embodiment of the present invention.

FIG. 10 is a schematic diagram to illustrate the pixel arrays of a plurality of pixel pairs for focus detection in an image pickup plane of the sensor 44. As shown in FIG. 10, a plurality of pixel pairs are disposed in a plurality of rows (three rows in this case) in the image pickup plane 44a and arranged in a matrix form.

According to the image pickup apparatus 1A having such configuration as well, as with the first embodiment described above, the circuit scale of the correlation computing section is not large and the correlation computation can be performed without an increase in the computation time.

As so far described, according to the image pickup apparatuses of the embodiment and each variant embodiment described above, a wide focus detection region can be used, and the circuit scale for correlation computation will not increase.

The present invention will not be limited to the above described embodiments and may be subjected to various changes and modifications etc. without departing from the spirit of the present invention.

What is claimed is:

1. An image pickup apparatus, comprising:
   an optical imaging system for forming an object image;
   an image pickup device including a plurality of pixels that photoelectrically converts the object image;
   a defocus quantity calculation section for calculating a defocus quantity based on a phase difference between a plurality of signals for focus detection obtained from a plurality of pixels for focus detection that respectively receive a light flux that passes through a different pupil region of the optical imaging system;
   a focusing section for driving the optical imaging system so as to achieve an in-focus state, in accordance with the defocus quantity calculated at the defocus quantity calculation section; and
   a thinning-out section for thinning out the plurality of signals for focus detection that are not used for calculating the defocus quantity, based on an analysis result of a signal component of the object image,
   wherein the thinning-out section compares the analysis result with one or two or more thresholds to determine a thinning-out quantity of the plurality of signals for focus detection.

2. The image pickup apparatus according to claim 1, wherein
   the plurality of pixels for focus detection are included in the image pickup device.

3. The image pickup apparatus according to claim 1, wherein
   the analysis result is a quantity of a high-frequency component included in the plurality of signals for focus detection obtained from the plurality of pixels for focus detection.

4. The image pickup apparatus according to claim 3, wherein
   the plurality of pixels for focus detection are provided extending over a plurality of rows in the image pickup device,
   one row of the plurality of rows is used for detecting the high-frequency component quantity, and another row of the plurality of rows is used for detecting the phase difference.

5. The image pickup apparatus according to claim 3, wherein
   the high-frequency component quantity is detected from an image signal obtained by adding a plurality of image signals from the image pickup device.

6. The image pickup apparatus according to claim 1, wherein
   the analysis result is a quantity of a high-frequency component included in an image signal of the object image from the image pickup device.

7. The image pickup apparatus according to claim 1, wherein
   the analysis result is an average luminance of the image signal of the object image from the image pickup device.

8. The image pickup apparatus according to claim 1, wherein
   the thinning-out section determines a thinning-out quantity of the plurality of signals for focus detection based on a thinning-out quantity storage table for storing in advance a thinning quantity in accordance with the analysis result.

9. The image pickup apparatus according to claim 1, wherein
   the pixel for focus detection is a pixel included in a sensor, the sensor being provided separately from the image pickup device.

10. The image pickup apparatus according to claim 1, wherein
    a phase difference of the plurality of signals for focus detection is calculated from a correlation value obtained at a correlation computing section, the correlation computing section adapted to receive an input of the plurality of signals for focus detection for each of the different pupil region.

11. The image pickup apparatus according to claim 10, wherein
    the thinning out section thins out the plurality of signals for focus detection that are inputted to the correlation computing section.

12. The image pickup apparatus according to claim 11, wherein
    the thinning-out section includes a thinning-out quantity determination section for determining a thinning-out quantity based on an analysis result of the signal component of the object image, and thins out the plurality of signals for focus detection according to the thinning-out quantity determined at the thinning-out quantity determination section.

13. The image pickup apparatus according to claim 1, wherein
    the defocus quantity is detected by using the image signal in one frame of the image pickup device, and
    the thinning-out section thins out the plurality of signals for focus detection in another frame other than the one frame of the image pickup device.

14. An image pickup apparatus, comprising:
    an optical imaging system for forming an object image;
    an image pickup device including a plurality of pixels that photoelectrically converts the object image;
    a plurality of pixels for focus detection included in the image pickup device and for respectively receiving a light flux that passes through a different pupil region of the optical imaging system;
    a correlation computing section for performing correlation computation for a plurality of signals for focus detection from a plurality of pixels for focus detection for each of the different pupil region;
    a defocus quantity calculation section for calculating a defocus quantity based on a phase difference between the plurality of signals for focus detection obtained by using a computation result of the correlation computing section;
    a focusing section for driving the optical imaging system so as to achieve an in-focus state in accordance with the defocus quantity calculated at the defocus quantity calculation section; and
    a thinning-out section for thinning out the plurality of signals for focus detection that are inputted to the correlation computing section, based on a quantity of a high-frequency component included in the plurality of signals for focus detection, or a high-frequency component quantity or an average luminance included in an image signal of the object image from the image pickup device,
    wherein the thinning-out section compares the analysis result with one or two or more thresholds, and determines a thinning-out quantity of the plurality of signals for focus detection.

15. The image pickup apparatus according to claim 14, wherein
the thinning-out section determines a thinning-out quantity of the plurality of signals for focus detection based on a thinning-out quantity storage table for storing in advance a thinning-out quantity in accordance with the analysis result.

16. The image pickup apparatus according to claim 14, wherein
the high-frequency component quantity is detected from an image signal obtained by adding a plurality of image signals from the image pickup device.

17. An image pickup apparatus, comprising:
an optical imaging system for forming an object image;
an image pickup device including a plurality of pixels that photoelectrically converts the object image;
a defocus quantity calculation section for calculating a defocus quantity based on a phase difference between a plurality of signals for focus detection obtained from a plurality of pixels for focus detection that respectively receive a light flux that passes through a different pupil region of the optical imaging system;
a focusing section for driving the optical imaging system so as to achieve an in-focus state, in accordance with the defocus quantity calculated at the defocus quantity calculation section; and
a thinning-out section for thinning out the plurality of signals for focus detection that are not used for calculating the defocus quantity, based on an analysis result of a signal component of the object image,
wherein the analysis result is an average luminance of the image signal of the object image from the image pickup device.

18. An image pickup apparatus, comprising:
an optical imaging system for forming an object image;
an image pickup device including a plurality of pixels that photoelectrically converts the object image;
a defocus quantity calculation section for calculating a defocus quantity based on a phase difference between a plurality of signals for focus detection obtained from a plurality of pixels for focus detection that respectively receive a light flux that passes through a different pupil region of the optical imaging system;
a focusing section for driving the optical imaging system so as to achieve an in-focus state, in accordance with the defocus quantity calculated at the defocus quantity calculation section; and
a thinning-out section for thinning out the plurality of signals for focus detection that are not used for calculating the defocus quantity, based on an analysis result of a signal component of the object image,
wherein the thinning-out section determines a thinning-out quantity of the plurality of signals for focus detection based on a thinning-out quantity storage table for storing in advance a thinning quantity in accordance with the analysis result.

19. An image pickup apparatus, comprising:
an optical imaging system for forming an object image;
an image pickup device including a plurality of pixels that photoelectrically converts the object image;
a defocus quantity calculation section for calculating a defocus quantity based on a phase difference between a plurality of signals for focus detection obtained from a plurality of pixels for focus detection that respectively receive a light flux that passes through a different pupil region of the optical imaging system;
a focusing section for driving the optical imaging system so as to achieve an in-focus state, in accordance with the defocus quantity calculated at the defocus quantity calculation section; and
a thinning-out section for thinning out the plurality of signals for focus detection that are not used for calculating the defocus quantity, based on an analysis result of a signal component of the object image,
wherein a phase difference of the plurality of signals for focus detection is calculated from a correlation value obtained at a correlation computing section, the correlation computing section adapted to receive an input of the plurality of signals for focus detection for each of the different pupil region,
wherein the thinning-out section thins out the plurality of signals for focus detection that are inputted to the correlation computing section, and
wherein the thinning-out section includes a thinning-out quantity determination section for determining a thinning-out quantity based on an analysis result of the signal component of the object image, and thins out the plurality of signals for focus detection according to the thinning-out quantity determined at the thinning-out quantity determination section.

20. An image pickup apparatus, comprising:
an optical imaging system for forming an object image;
an image pickup device including a plurality of pixels that photoelectrically converts the object image;
a defocus quantity calculation section for calculating a defocus quantity based on a phase difference between a plurality of signals for focus detection obtained from a plurality of pixels for focus detection that respectively receive a light flux that passes through a different pupil region of the optical imaging system;
a focusing section for driving the optical imaging system so as to achieve an in-focus state, in accordance with the defocus quantity calculated at the defocus quantity calculation section; and
a thinning-out section for thinning out the plurality of signals for focus detection that are not used for calculating the defocus quantity, based on an analysis result of a signal component of the object image,
wherein the analysis result is a quantity of a high-frequency component included in the plurality of signals for focus detection obtained from the plurality of pixels for focus detection,
wherein the plurality of pixels for focus detection are provided extending over a plurality of rows in the image pickup device, and
wherein one row of the plurality of rows is used for detecting the high-frequency component quantity, and another row of the plurality of rows is used for detecting the phase difference.

21. An image pickup apparatus, comprising:
an optical imaging system for forming an object image;
an image pickup device including a plurality of pixels that photoelectrically converts the object image;
a defocus quantity calculation section for calculating a defocus quantity based on a phase difference between a plurality of signals for focus detection obtained from a plurality of pixels for focus detection that respectively receive a light flux that passes through a different pupil region of the optical imaging system;
a focusing section for driving the optical imaging system so as to achieve an in-focus state, in accordance with the defocus quantity calculated at the defocus quantity calculation section; and a thinning-out section for thinning out the plurality of signals for focus detection that are not used for calculating the defocus quantity, based on an analysis result of a signal component of the object image, wherein the defocus quantity is detected by using the image signal in one frame of the image pickup device, and wherein the thinning-out section thins out the plurality of signals for focus detection in another frame other than the one frame of the image pickup device.

22. An image pickup apparatus, comprising:

an optical imaging system for forming an object image;

an image pickup device including a plurality of pixels that photoelectrically converts the object image;

a plurality of pixels for focus detection included in the image pickup device and for respectively receiving a light flux that passes through a different pupil region of the optical imaging system;

a correlation computing section for performing correlation computation for a plurality of signals for focus detection from a plurality of pixels for focus detection for each of the different pupil region;

a defocus quantity calculation section for calculating a defocus quantity based on a phase difference between the plurality of signals for focus detection obtained by using a computation result of the correlation computing section;

a focusing section for driving the optical imaging system so as to achieve an in-focus state in accordance with the defocus quantity calculated at the defocus quantity calculation section; and a thinning-out section for thinning out the plurality of signals for focus detection that are inputted to the correlation computing section, based on a quantity of a high-frequency component included in the plurality of signals for focus detection, or a high-frequency component quantity or an average luminance included in an image signal of the object image from the image pickup device, wherein the thinning-out section determines a thinning-out quantity of the plurality of signals for focus detection based on a thinning-out quantity storage table for storing in advance a thinning-out quantity in accordance with the analysis result.

* * * * *